May 15, 1951  D. LEVINE  2,552,566
SCANNING SYSTEM
Filed May 2, 1949  2 Sheets-Sheet 1
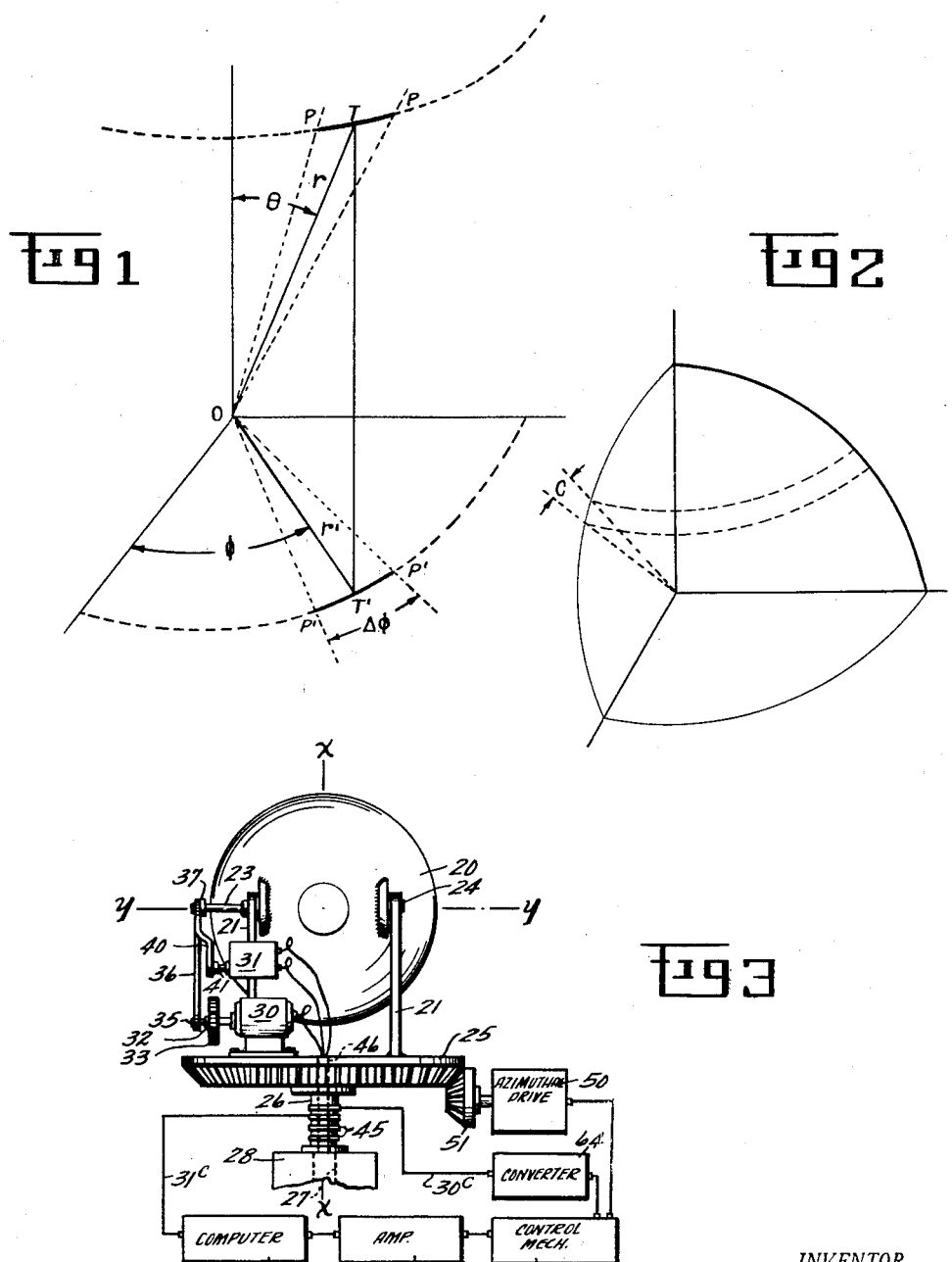
INVENTOR.
DANIEL LEVINE
BY Wade Koontz
ATTORNEY
N. N. Losche
AGENT May 15, 1951　　　　　　　D. LEVINE　　　　　　2,552,566
SCANNING SYSTEM
Filed May 2, 1949　　　　　　　　　　　2 Sheets-Sheet 2
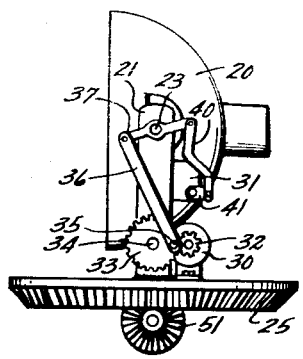
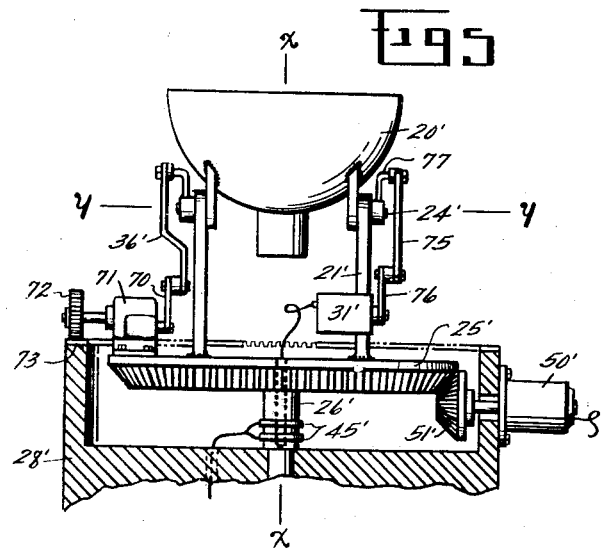
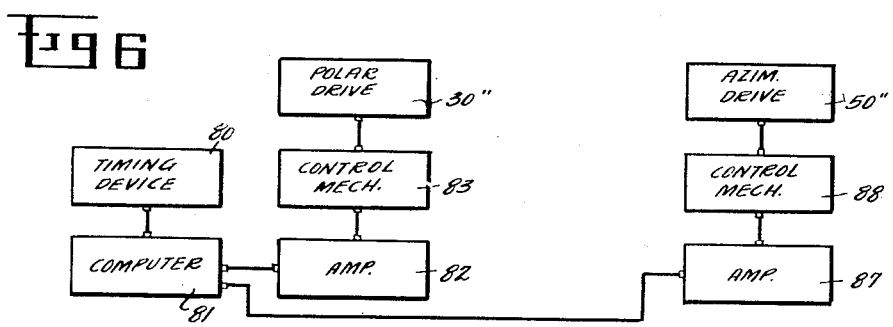
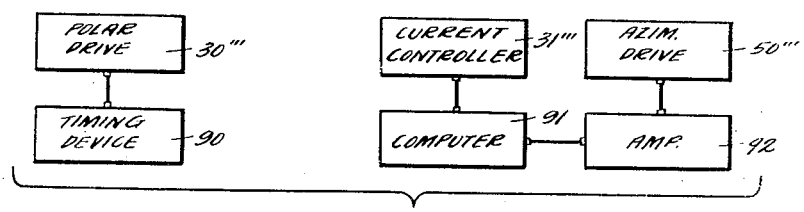
INVENTOR.
DANIEL LEVINE
BY
　Wade Koontz
　　ATTORNEY
　H. H. Losche
　　AGENT Patented May 15, 1951

2,552,566

UNITED STATES PATENT OFFICE 2,552,566

SCANNING SYSTEM

Daniel Levine, Dayton, Ohio

Application May 2, 1949, Serial No. 90,981

8 Claims. (Cl. 318—68)

(Granted under the act of March 3, 1883, as amended April 30, 1928; 370 O. G. 757)

The invention decribed herein may be manufactured and used by or for the United States Government for governmental purposes without payment to me of any royalty thereon.

This invention relates to scanning systems and more particularly to scanning systems in which the azimuthal angular velocity and the polar or colatitude angular speed of the scanning element, or scanning device, change at directionally proportional rates which are based upon the polar angular displacement to effect a uniformly scanned volume requiring a minimum amount of time.

In order to scan a volume with a scanning device, a certain amount of time must be spent in each section of the volume scanned in order to have the scanning device respond to a target or object. In order to scan the volume is a minimum amount of time, the azimuthal angular velocity and the polar angular speed of the scanning device should be a function of the polar or colatitude angular displacement thereof from the azimuthal axis of spin. The scanning system may be of any type as radar, sonar, Doppler radar, target pulsed radar, infra-red detection, searchlights, etc., which would be acceptable for the particular application or use.

In accordance with this invention, the scanning device is driven to rotate rapidly in the azimuthal direction about the azimuthal axis of spin and at the same time to change slowly in the polar or colatitude angular direction relative to the azimuthal axis of spin at a predetermined velocity ratio such that the focus or search of the scanning device rests in each section of the scanned volume for an equal time duration. That is, a scanning system is used in which the scanning device scans a spherical volume or spherical section thereof wherein the scanning device is positioned at the center of curvature. The azimuthal angular velocity and the polar angular velocity of the scanning device are related to the polar or colatitude angular position thereof such that the scanning device focus or beam pattern covers a section in the region of the equatorial plane for the same time period that this beam pattern rests on an equal section near the azimuthal axis of spin. To accomplish this, the azimuthal angular velocity is maintained in a direct proportion to the polar angular speed and the angular velocity of the scanning device about both axes is increased as the scan travels from the equatorial plane toward the azimuthal axis of spin, and vice versa. In carrying out this invention, the scanning device is controlled to have a polar or colatitude angular velocity directly proportional to the quotient resulting from the product of the azimuthal angular velocity and the angle subtended at the origin by any two adjacent scan circles measured on a meridian plane as the dividend, and the product of $2\pi$ as the divisor.

The means for effecting actuation of the scanning device, as a radar antenna, searchlight, etc., in the two related angular directions may be carried out by an electrical-mechanical combination of devices, mechanical, hydraulic, pneumatic, or by any combination of these means. The electromechanical means shown and described has the advantages of being simple, durable and accurate and is considered preferable although other means of actuating the scanning device may prove quite satisfactory. The scanning device is journaled to be rotated in an azimuthal direction about an azimuthal axis of spin as well as in the polar or colatitude angular direction about an axis perpendicular to the azimuthal axis of spin. A motive power means is geared, belted, or otherwise operatively associated with the supporting structure of the scanning device to spin the scanning device about the azimuthal axis of spin. The scanning device is moved in a desired range of polar angles by power from the above mentioned motive power means, or a separate motive power means may be used to motivate the scanning device in this polar angular direction. Since the speed relation of the scanning device in its two angular directions must depend on the polar or colatitude angular position of the scan provided by the scanning device, a mechanical or electrical follow-up, a combination of these two, or a timing device fixing the polar or colatitude angular position in point of time, is used as a basis on which the speed relation is determined. Relying on the follow-up signal responsive to the polar or colatitude angular position, or a signal from a timing device, the scanning device is made to rotate about the azimuthal axis of spin at a speed directly proportional to the angular velocity of the scanning device through its polar or colatitude angles. Accordingly, the invention has for its object the provision of a scanning system in which the scanning device thereof is rotated in the azimuthal direction about an azimuthal axis of spin and in a polar or colatitude angular direction about an axis perpendicular to the azimuthal axis of spin at direct proportional speeds determined by the polar angular position in order that the scanning device provides a scan of uniform quality for the entire volume scanned requiring a minimum amount of time.

These and other objects and advantages will become more apparent as the description proceeds when taken in conjunction with the accompanying drawings, in which;

Fig. 1 is an illustration in polar coordinates showing the scanning beam on a target or object, the use of which provides a mathematical derivation for the scanning speed in related angular directions;

Fig. 2 illustrates in polar coordinates the angle between consecutive scan circles;

Fig. 3 illustrates a scanning system partly in diagrammatical elevation and partly in block diagram of one embodiment of the invention;

Fig. 4 shows a side elevational view of the mechanical scanning mechanism illustrated in Fig. 3;

Fig. 5 illustrates another embodiment of the invention partly in diagrammatical elevation and section and partly in block diagram;

Fig. 6 illustrates another embodiment of the invention in block diagram; and

Fig. 7 illustrates still another embodiment of the invention in block diagram.

Referring to Fig. 1 in particular, the axes for polar coordinates are shown in which a scanning device is placed at the origin o and at the instant beamed on an elevated target T on the circle of sweep, or small circle (partially shown in dashed lines). The length of any chord subtending an angle in a circle is the product of twice the radius and the sine of one-half that angle. The target T is at the reference points of the scanning device when it is a linear distance, or chord of length TP, equal to $$2r \sin \frac{H}{4}$$

where H is the angular separation between the reference points, hereinafter referred to as the beam width. The target T and reference points P are projected downward to T' and P' on the projection of the small circle (partially shown in dashed lines) in the equatorial plane. The chord T'P' on the projection of the small circle is;

$$2r' \sin \frac{\Delta \phi}{4}$$

where, $r' = r \sin \theta$. Therefore, $$T'P' = 2r \sin \theta \sin \frac{\Delta \phi}{4}$$

where $\theta$ is the angle between the center of the beam and the azimuthal axis of spin and $\Delta\phi$ is the angle in the equatorial plane between the projected reference points. Therefore, $$\sin \frac{H}{4} = \sin \theta \sin \frac{\Delta \phi}{4}$$

or, $$\Delta \phi = 4 \sin^{-1} \left( \frac{\sin \frac{H}{4}}{\sin \theta} \right)$$

For $\sin \theta$ greater than $$\sin \frac{H}{4}$$

a series expansion of the arcsine is permissible;

$$\sin^{-1} \left( \frac{\sin \frac{H}{4}}{\sin \theta} \right) = \frac{\sin \frac{H}{4}}{\sin \theta} + \frac{1}{2} \cdot \frac{\sin^3 \frac{H}{4}}{3 \sin^3 \theta} + \frac{1}{2} \cdot \frac{3}{4} \cdot \frac{\sin^5 \frac{H}{4}}{5 \sin^5 \theta} + \cdots$$

This series is approximately equal to the first term for most of the volume, whatever the value of H may be. Therefore, $$\Delta \phi = 4 \frac{\sin \frac{H}{4}}{\sin \theta} = \frac{H}{\sin \theta}$$

The design of the scanning system should be based upon having the target T between the reference points of the scanning device for a time t seconds where t depends upon the scanning loss which the designer plans for his equipment. Where the scanning device is a pulsed radar, for example, $$t \frac{H}{p}$$

where N is the number of pulses per beam width and p is the pulse repetition rate.

The azimuthal angular velocity of scan is;

$$\omega_a = \frac{\text{angle}}{\text{time}} = \frac{\Delta \phi}{t} = \frac{H}{t \sin \theta} = \frac{H \csc \theta}{t} \text{ radians per second}$$

Thus, for scanning systems, similar to the type described, the azimuthal angular velocity is a function of the polar or colatitude angular displacement of the scanning device.

Upon the scanning device completing one revolution around the circle of sweep of Fig. 1, it changes in a polar or colatitude angle, referred to herein as the angle C and better seen in Fig. 2, measured along the meridian plane. Therefore, the scanning device changes its elevation by an angle C in the time for one azimuthal revolution, $$\frac{60}{R}$$

seconds, where R is the azimuthal revolutions per minute. Thus, the "smoothed out" polar angular velocity is;

$$\omega_p = \frac{CR}{60} \text{ radians per second}$$

But, $$\frac{60}{R}$$

the period of azimuthal rotation, is found as follows:

One complete revolution is $2\pi$ radians. The angle $\Delta\phi$ between the projected reference points in the azimuthal plane is;

$$\frac{H}{\sin \theta}$$

as determined hereinabove. Therefore, the number of beam widths in the small circle is;

$$\frac{2\pi \sin \theta}{H}$$

Since t seconds are devoted to each beam width, the period of one azimuthal revolution is;

$$\frac{2\pi t \sin \theta}{H}$$

Then;

$$\omega_p = \frac{CH}{2\pi t \sin \theta} = \frac{CH \csc \theta}{2\pi t} = \frac{C}{2\pi} \omega_a \text{ radians per second}$$

Thus, the polar angular velocity of the scanning device is directly proportional to the azimuthal angular velocity thereof determined by the polar angular position to effect uniform scan for the entire volume scanned.

Referring to Figs. 3 and 4, there is diagrammatically illustrated one embodiment of the invention carrying out the concept of maintaining a uniform scan over the whole volume searched by the scanning device. A scanning device 20, as a radar antenna, searchlight, etc., is pivotally mounted on two upstanding members 21 by the trunnions 23 and 24. The two upstanding members 21 are fixed at their lower ends to the top surface of a bevel gear 25. The bevel gear 25 has a hub 26 on the lower side concentric with the axis thereof and a shaft 27 extends downwardly from the hub 26 into a supporting structure 28 journaling the bevel gear such that the bevel gear 25 and the supported scanning device 20 are free to rotate as a unit about the axis $x$—$x$ and the detecting device 20 is free to rotate in an arc with respect to the bevel gear 25 about the axis $y$—$y$.

On one of the upstanding members 21 is mounted an electric motor 30 and an adjustable electric current regulator 31, as a rheostat, or the like. The motor 30 has a small pinion 32 fixed to its rotor shaft which is in mesh with a relatively large spur gear 33. The spur gear 33 is journaled on a jack shaft 34 supported in the upstanding member 21. Eccentric to the jack shaft 34, and preferably near the spur gear 33, is a stud 35 journaling the lower end of a link 36. The link 36 has its upper ends journaled to one end of a lever arm 37 attached centrally to the outer end of the trunnion 23. The radius of the journal point on the lever arm 37 for the link 36 is enough greater than the radius of the journal point of the link 36 on the spur gear 33 to cause the scanning device 20 to scan the desired polar angle. The opposite end of the lever 37 has a link 40 journaled thereto, the lower end of which is pivotally connected to an actuatable arm 41 of the current controller 31. The leads of the electric motor 30 and the current controller 31 are connected to slip rings 45 on the hub 26 of the bevel gear through a central passage 46. The bevel gear 25 is driven by an electric motor 50 having a small bevel gear 51 on its rotor shaft in mesh with the bevel gear 25.

In order to control the two electric motors in accordance with the polar angular position of the scanning device 20, the current controller 31 is electrically connected through slip rings 45 and through electrical conductors 31c to a computer 61. Any suitable computer of well known construction may be used such as a mechanically controlled computer or an electronic computer where the follow-up system from the scanning device is mechanical or electrical, respectively. The mechanical cam operated computers have proved to be more accurate than electronic computers but, since a high degree of accuracy is not essential to the present invention and since the computer is recognized as being a well known element, the computer is shown and described as an element in block and only referred to as being electrical to illustrate the invention in the simplest manner. The computer 61 is used to correlate the polar or colatitude angle of the scanning device 20 pattern with the azimuthal angular velocity function. The computer 61 is connected through an amplifier 62 to a control mechanism 63, which may be electrical or electromechanical, to control the output circuits to the two driving motors 30 and 50. The control mechanism may be of any well known construction capable of varying the speed of the motors 30 and 50 at the proper ratio in accordance with the input signal from the computer 61 through the amplifier 62. Such an electrical control mechanism may be auto-transformers, rheostats, or the like, with an electric servo-motor mechanism combined therewith to transmit the control signal from the computer to the auto-transformer, rheostat, or the like, and is not a new component per se in this invention. In a control mechanism for a fluid system, a pilot operated valve may be used to control the fluid motor speed; or mechanical multiplying linkage may be utilized as a control mechanism for a mechanical follow-up and computer. One output of the control mechanism 63 is directly connected to the drive motor 50, hereinafter referred to as the azimuthal drive motor, and another output of the control mechanism 63 is connected through a converter 64, conductors 30c and the slip rings 45 to the drive motor 30, hereinafter referred to as the polar angular drive motor. The converter 64, electrical or electro-mechanical, has an electrical output of current characteristics to drive the polar angular drive motor 30 at a speed to cause rotation of the scanning device 20 in the polar angular direction at a ratio of $$\frac{C}{2\pi}$$

to the azimuthal angular speed. The current controlling device 31 is connected mechanically to the scanning device 20 and associated to the computer and control mechanism such that as the scan progresses from the plane described by the $y$—$y$ axis toward the vertical $x$—$x$ axis, the speed of both motors 30 and 50 increase although the ratio of the polar angular speed to the azimuthal angular velocity remains unchanged.

It must be recognized that by the theoretical analysis of the scanning system just described the speeds of the two control motors 30 and 50 would be infinite for a scanning device searching substantially a hemisphere when the scanning device is directed along the azimuthal angle of spin, or $x$—$x$ axis. Since the speeds of the two motors 30 and 50 are quite high when the scanning device is 10 or 15 degrees from the azimuthal axis of spin and the small circle of sweep is short in circumference, the speeds of these two motors are held constant throughout the small polar angle as a practical means of completing the scan to the azimuthal axis of spin. The control mechanism 63 may very well control the motor speeds in this range, or the motors may incorporate governors for speed limitations, or the computer may be designed to change its function to produce an output signal capable of causing the motors to maintain a constant speed in this range.

From the foregoing, it may be understood that the scanning device 20 will, in operation, revolve about the axis $y$—$y$ and at the same time revolve about the axis $x$—$x$ at a predetermined ratio such that a volume is scanned of uniform quality in the shortest possible time. Such a scanning system provides for very rapid scanning of a volume which is most desirable for detection of objects, as fast moving missiles, planes, or the like, that demand faster scanning systems. It may also be understood that the scanning device may be made to scan a volume substantially more than a hemisphere, or a volume of a spherical zone by changing the length of the link 36. By using a plurality of such scanning systems with their azimuthal axes in alignment and all adapted to scan a spherical zone, a cylindrical volume may be scanned very effectively.

The scanning system may use only one power motor as illustrated in Fig. 5 in which the scanning device 20' is rotated about its $y$—$y$ axis by the link 36' being rotatably attached at its lower end to the output arm 70 of a gear reduction mechanism 71 that is driven through its input shaft by a small spur gear 72. The spur gear 72 is in mesh with a ring gear 73 made integral, or secured, to the supporting framework structure of the system. The reduction gear mechanism 71 is secured to the bevel gear 25' in any well known manner. The bevel gear 25' is rotatably mounted on the supporting structure as described for the above embodiment and the motor 50' mounted on the supporting structure to rotate the bevel gear 25'. The reduction gear mechanism 71 together with the gear combination 72, 73 are arranged to cause the scanning device 20' to rotate in the polar angular direction at a speed in the ratio of $$\frac{C}{2\pi}$$

of the azimuthal angular velocity thereof. The control circuit has the same elements as the above embodiments. The current controlling device 31' is shown on the upstanding member 21 opposite the member adjacent the line 36' and is connected to be actuated in accordance with the polar angular position of the scanning device by a link 75 pivotally connecting a lever 76 on the current controlling device 31' and a lever 77 on the trunnion 24' of the scanning device 20'. It may be readily understood that upon operation of the motor 50' the bevel gear 25' will be rotated to cause the scanning device 20' to be rotated about the $x$—$x$ axis. Such rotation causes the small gear 72 of the gear reduction mechanism 71 to walk around the ring gear 73 rotating the arm 70 which motion is transferred to the scanning device 20' through the link 36' imparting a reversible motion to the scanning device 20' rotating it about the $y$—$y$ axis. The sweep of the arm 70 is less than that of the arm between the link 36' and the scanning device 20' wherein the scanning device 20' is only moved over the desired polar angle.

As illustrated in block diagram in Fig. 6, two motors 30'' and 50'' may be used to actuate the scanning device in the polar angular direction and the azimuthal angular direction, respectively, in the manner illustrated in Figs. 2 and 3. The circuit for the polar angular driving motor 30'' includes a timing device 80, a computer 81, an amplifier 82, and a control mechanism 83 connected in the order named with the output of the control mechanism connected to the motor 30''. The timing mechanism may be of any well known construction as an electric clock for electric devices, or a tuning fork for mechanical devices, controlling a current regulator or rheostat. The circuit to the azimuthal drive motor 50'' includes an amplifier 87 connected to a second output of the computer 81 and a control mechanism 88 connected into the motor 50''. The computer 81 would then operate to control both circuits in accordance with the angle of the scanning device as a function of time. Each control mechanism would operate to control the motor speed in its circuit to maintain an angular velocity of the scanning device in the polar direction in a ratio of $$\frac{C}{2\pi}$$

that of the angular velocity of the scanning device in the azimuthal angular direction whereby the scan is of uniform quality throughout the volume scanned making the time of scanning a minimum. Each motor 30'' and 50'' could have separate timing devices and computers where the timing devices are accurate enough to run in synchronism.

Fig. 7 illustrates another manner in which the scanning system may be carried out. The polar angular drive motor 30''' is controlled by a timing device 90 to regulate the motor speed in accordance with time such that the motor speed changes at a predetermined rate with respect to the polar angular position of the scanning device. A current controlling device 31''', such as the follow-up current controllers 30 and 31', responsive to polar angular positions, is connected to a computer 91. The computer 91 is connected through an amplifier 92 to the azimuthal angle drive motor 50'''. By this arrangement, the polar angular speed and the azimuthal angular velocity of the scanning device are maintained at a predetermined ratio as determined by the polar angular displacement of the scanning device.

While I have more particularly described my invention by using electrical elements for driving and controlling a scanning device by way of illustration, it is to be understood that the invention may be practiced by using other types of motors as hydraulic, pneumatic, etc., and the follow-up and controlling components may correspond thereto. It is essential that the polar angular velocity of the scanning device be maintained at a ratio of $$\frac{C}{2\pi}$$

that of the azimuthal angular velocity with the velocities of these two angular motions at this fixed ratio being dependent on the polar angular displacement of the scanning device.

While I have illustrated the preferred embodiments of this invention, it is to be understood that various changes and modifications may be made without departing from the spirit and scope thereof and I desire to be limited only by the scope of the appended claims.

I claim:

1. A scanning system for scanning a volume of uniform quality in the minimum of time comprising; a scanning device journaled on a supporting structure to rotate about spin and polar axes, said axes being at right angles; motive power means operatively connected to rotate said scanning device about both of its axes simultaneously, said operative connection including means for rotating said scanning device about the polar axis at a directly proportional reduced angular velocity with respect to the angular velocity of said scanning device about the spin axis; and means responsive to the angular displacement of said scanning device for controlling the speed of said motive power means to cause rotation of the scanning device in its two angular directions to increase as the scanning device approaches the spin axis and to decrease as the scanning device approaches the plane perpendicular to the spin axis through said scanning device.

2. A scanning system for scanning a volume of uniform quality in the minimum of time comprising; a scanning device journaled on a supporting structure to rotate in an azimuthal direction about a spin axis and in a polar direction about a polar axis perpendicular to said spin axis; means associated with said scanning device to provide reversible rotation thereof about said polar axis over an arc at a speed directly proportional to the product of the angular deviation of said scanning device along a meridian plane per revolution thereof about said spin axis and the angular velocity in the azimuthal direction divided by $2\pi$; and means associated with said scanning device responsive to angular deviations thereof from said spin axis for varying the speed of said scanning device in its two angular directions at the directly proportional rate in accordance with the angular displacement of the scanning device with said spin axis.

3. A scanning system for scanning a volume of uniform quality in the minimum of time comprising; a scanning device journaled on a supporting structure to rotate in an azimuthal direction about a spin axis and in a polar direction about a polar axis perpendicular to said spin axis to search a volume of a spherical portion; azimuthal motive power means operatively connected to said scanning device for spinning said scanning device about said spin axis; polar angular motive power means mechanically connected to said scanning device for reversibly rotating said scanning device over an arc about said polar axis; polar angle responsive means connected to said scanning device; and means connecting said polar angle responsive means and said motive power means for controlling the speed relation of said azimuthal motive power means and said polar angular motive power means such that said polar angular motive power means drives said scanning device reversibly about the polar axis at an angular velocity in a direct proportion of $$\frac{C}{2\pi}$$

to the angular velocity of said scanning device about the spin axis, where C is the angular deviation of said scanning device about the polar axis per revolution thereof about the spin axis, and said last mentioned means varies the speed of said motive power means to increase the angular velocity thereof as the search of the scanning device approaches the polar region of scan and decreases as the search of the scanning device approaches the equatorial region of scan whereby the scanning device is directed to search equal volume sections for equivalent time periods requiring a minimum of time for a uniform quality of complete scan.

4. A scanning device as set forth in claim 3 wherein said last mentioned means connecting said polar angle responsive means includes a computer for correlating the polar angle of said scanning device with the azimuthal angular velocity function thereof, and a control mechanism for regulating the motor speeds in accordance with the resultant output of said computer.

5. A scanning system for scanning a volume of uniform quality in the minimum of time comprising; a scanning device journaled on a supporting structure to rotate in an azimuthal direction about a spin axis and in a polar angular direction about a polar axis perpendicular to said spin axis; means on said supporting structure and said scanning device for reversibly rotating said scanning device through an arc about the polar axis at a velocity directly proportional to the product of the angular deviation of said scanning device in the polar plane per revolution thereof about said spin axis and the angular velocity of said scanning device about the spin axis divided by $2\pi$; motive power means operatively connected to said scanning device for spinning said scanning device about said spin axis; and means responsive to polar angular deviations of said scanning device for controlling the speed of said motive power means in accordance with the polar angular position of said scanning device to provide an increase in the scanning speed upon decrease in polar angle whereby the scanning device is directed to scan equal volume of sections for equivalent time periods requiring a minimum of time for a uniform quality of complete scan.

6. A scanning device as set forth in claim 5 wherein said last mentioned means responsive to polar angular deviations includes a computer for correlating the polar angle of the scanning device with the azimuthal angular velocity function thereof, and a control mechanism for regulating the speed of said motive power means in accordance with the resultant of the computer.

7. A scanning system for scanning a volume of uniform quality in the minimum of time comprising; a scanning device journaled on a supporting structure to rotate in an azimuthal direction about a spin axis and in a polar angular direction about a polar axis perpendicular to said spin axis; motive power means for spinning said scanning device about its spin axis; motive power means for reversibly rotating said scanning device through an arc about said polar axis; means for controlling the speed relation of said two motive power means to produce a polar angular velocity of said scanning device directly proportional by $$\frac{C}{2\pi}$$

the angular velocity of said scanning device about the spin axis, where C is the polar angular deviation of the scanning device per revolution thereof about the spin axis; and timing means for varying the speed of both said motive power means in their proportional speed relation in accordance with the polar angular position of said scanning device by reference to time taken for said scanning device to complete each cycle.

8. A scanning system for scanning a hemispherical volume with a substantially uniform quality in a minimum of time comprising; a scanning device mounted for continuous rotation about a spin axis and journalled for rotation in elevation about a polar axis through an angular movement encompassing substantially a hemisphere, power actuated variable speed driving means operatively connected to said scanning means for rotating the same about the spin and polar axes and control means responsive to the polar angle of the scanning means for varying the angular velocity of the scanning about its spin and polar axes such that the velocities vary in accordance with the polar angle and the ratio of the angular velocities remains substantially constant.

DANIEL LEVINE.

REFERENCES CITED

The following references are of record in the file of this patent:

UNITED STATES PATENTS

| Number | Name | Date |
|---|---|---|
| 2,410,831 | Maybarduck et al. | Nov. 12, 1946 |